UNITED STATES PATENT OFFICE.

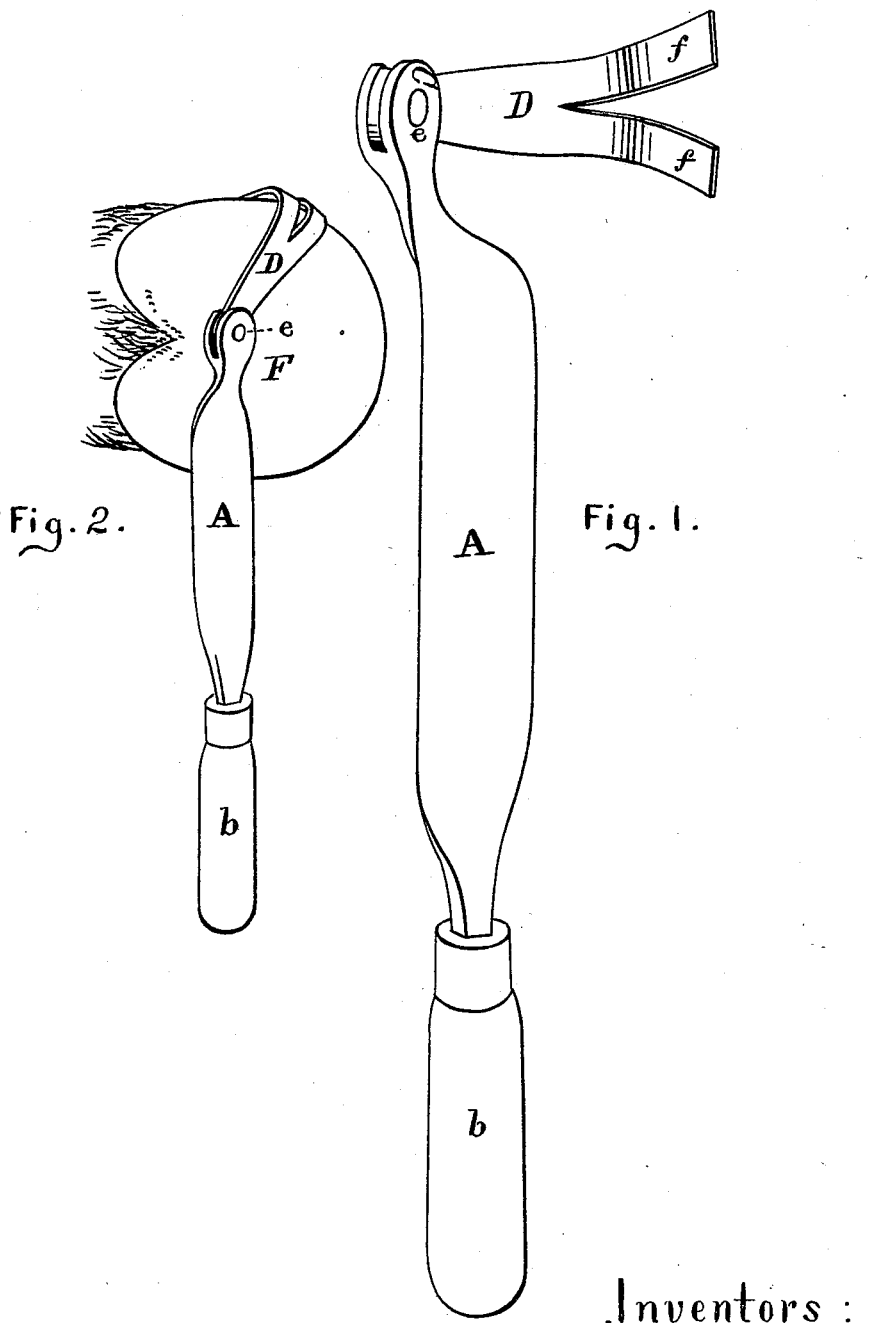

LEVI S. BURROUGHS AND MORTON M. CARROTHERS, OF SULPHUR SPRINGS, OHIO.

IMPROVEMENT IN HOOF-PARERS.

Specification forming part of Letters Patent No. 177,201, dated May 9, 1876; application filed February 10, 1876.

*To all whom it may concern:*

Be it known that we, LEVI S. BURROUGHS and MORTON M. CARROTHERS, of Sulphur Springs, in the county of Crawford and State of Ohio, have invented certain new and useful Improvements in Instruments for Trimming Horses' Hoofs for Shoeing; and we do hereby declare that the following is a full, clear, and exact description thereof, which will enable others skilled in the art to which it appertains to make and use the same, reference being had to the accompanying drawings, and to the letters of reference marked thereon, which form a part of this specification.

Figure 1 is a plan view of our invention. Fig. 2 is also a plan view representing the knife and hoof.

A is a two-edged knife, provided with the handle $b$, and having attached thereto by the swivel-joint C the adjustable hook D. The knife has a slightly-curved metallic projection, extending from the extreme point thereof for the formation of a swivel-joint in connection with the hook D and rivet $e$. D represents a hook, which is provided with the flaring prongs $f$, and is attached to the knife by the swivel-joint C. F represents the hoof as clutched by the hook D, and shows the manner in which it is trimmed.

The knife can be reversed or used alternately with the right or left hand, projected forward or backward. When it is applied to the hoof the hook D and swivel-joint C form a lever, whose fulcrum is on the opposite side of the hoof from that which is designed to be trimmed, which enhances the power, and greatly facilitates the work of the operator.

The clamping-hook D is provided with the flaring prongs $f f$, which, radiating from the shaft of the said clamp, form a clutch, which is designed to be held steadily in position by a nail, which may be slightly driven into the hoof through the opening formed by the peculiar structure of the clutch, which is also designed for drawing nails from the hoof.

It will be observed from the formation of the knife that after it passes the frog of the hoof it projects downward toward the hoof about one-half inch.

In this connection we hereby disclaim the improvements shown in the invention of T. B. and L. W. Kelley, patented November 25, 1862, No. 37,000.

We claim—

The combination of the blade A, having the handle $b$, and swivel-joint C, and the clamping-hook D, provided with the flaring prongs $f$, substantially as shown, and for the purpose described.

In testimony that we claim the foregoing as our own we affix our signatures in presence of two witnesses.

LEVI S. BURROUGHS.
  MORTON M. CARROTHERS.

Witnesses:
 L. L. TEEL,
 JOHN B. SQUIER.